(12) United States Patent
Shoji et al.

(10) Patent No.: US 8,699,910 B2
(45) Date of Patent: Apr. 15, 2014

(54) SEAL MEMBER FOR PREVENTING LEAKAGE OF MICRO-POWDER FROM ROTATING BODY

(75) Inventors: Susumu Shoji, Kobe (JP); Kazuro Fukui, Kobe (JP)

(73) Assignee: Sanwa Techno Co., Ltd., Kobe-shi, Hyogo (JP)

( * ) Notice: Subject to any disclaimer, the term of this patent is extended or adjusted under 35 U.S.C. 154(b) by 60 days.

(21) Appl. No.: 13/389,727

(22) PCT Filed: Jul. 31, 2010

(86) PCT No.: PCT/JP2010/062962
§ 371 (c)(1),
(2), (4) Date: Apr. 23, 2012

(87) PCT Pub. No.: WO2011/018948
PCT Pub. Date: Feb. 17, 2011

(65) Prior Publication Data
US 2012/0201565 A1     Aug. 9, 2012

(30) Foreign Application Priority Data

Aug. 10, 2009   (JP) .................. 2009-185528

(51) Int. Cl.
*G03G 15/08*     (2006.01)
(52) U.S. Cl.
USPC ........................................... 399/103
(58) Field of Classification Search
USPC ............... 399/103, 105, 106, 98
See application file for complete search history.

(56) References Cited

U.S. PATENT DOCUMENTS

| | | | |
|---|---|---|---|
| 6,115,566 A | 9/2000 | Ohara et al. | |
| 2003/0091365 A1* | 5/2003 | Sahara | 399/103 |
| 2005/0095031 A1* | 5/2005 | Hashimoto et al. | 399/103 |

FOREIGN PATENT DOCUMENTS

| | | |
|---|---|---|
| JP | 11-061101 A | 3/1999 |
| JP | 11-125971 A | 5/1999 |
| JP | 2004-077920 A | 3/2004 |
| JP | 2004-078003 A | 3/2004 |
| JP | 2005-201427 A | 7/2005 |
| JP | 2005-300910 A | 10/2005 |
| JP | 2007-256691 A | 10/2007 |

OTHER PUBLICATIONS

International Search Report of PCT/JP2010/062962, mailing date of Aug. 24, 2010.

* cited by examiner

*Primary Examiner* — Sophia S Chen
(74) *Attorney, Agent, or Firm* — Westerman, Hattori, Daniels & Adrian, LLP (57) ABSTRACT

A seal member is described that is configured to prevent leakage of micro-powder from a rotating body such as a developing roller. The seal member of the rotating body of an image forming device using toner of the micro-powder includes base fabric consisting of knitting or fabric, loop-shaped pile yarn or cut-shaped pile yarn, which is supported on a surface of the base fabric by the entanglement or support of ground yarn of the base fabric, and a coating layer which has penetrated from a back surface of the base fabric to which a coating agent is applied to the side of pile yarn. A height of the coating agent which has penetrated from the back surface of the base fabric is the same as or less than a thickness of the base fabric which is configured by the height of the ground yarn which supports the pile yarn.

4 Claims, 6 Drawing Sheets

PRIOR ART

FIG.11

SEAL MEMBER FOR PREVENTING LEAKAGE OF MICRO-POWDER FROM ROTATING BODY

TECHNICAL FIELD

The present invention relates to a seal member for micro-powder made of ultra-fine fiber so as not to allow micro-powder to leak from a rotation shaft, etc., of a carrier of micro-powder such as toner of an electrophotographic copier or printer.

BACKGROUND

An electrophotographic copier or printer has a seal member made of fiber sealing a portion of a rotation shaft of a powder carrier so as not to allow powder to leak from the portion of the rotation shaft of the carrier of micro-powder such as toner. When such a powder carrier is used, fiber falls off from an end of the seal member (hereinafter, the falling off of fiber is referred to as "fiber-falloff"). Conventionally, to take measures for the fiber-falloff, a back face of a foundation cloth made of ground yarn supporting the fabric of the seal member is subjected to a coating process with a coating agent, i.e., a backing process with a backing agent to prevent the fiber-falloff. However, recently, as powder used are further reduced in size, ultra-fine fiber thinner than conventional fiber is increasingly used as the fiber used for the seal member. The method of taking measures for the fiber-falloff using a coating, i.e., backing (hereinafter referred to as "coating") process executed for conventional fiber does not sufficiently prevent the fiber-falloff since the fiber-falloff occurs from a cutting end portion when a seal member made of the ultra-fine fiber is cut into a predetermined shape as a seal member. Therefore, this leads to the occurrence of a phenomenon that the fiber-falloff does not stop even if the seal member made of the ultra-fine fiber is subjected to predetermined cleaning in advance before use. With regard to a thickness of fiber making up a pile used for the seal member, ultra-fine continuous fiber having a diameter equal to or less than 3 deniers, i.e., 20 µm is recently increasingly used for sealing micro-powder of several microns. However, even the pile yarn using this ultra-fine continuous fiber leads to the notable occurrence of the phenomenon that the fiber-falloff does not stop.

In consideration of the sealing property of the seal member, ultra-fine fiber is recently used in, for example, an image forming apparatus and a copier forming an image in an electrophotographic mode, so as to prevent leakage of toner, which is powder, from the root of the seal member. Since the ultra-fine fiber or the pile yarn spun from the ultra-fine fiber is used for preventing the toner leakage, it increasingly becomes difficult to open the root of the ultra-fine fiber or to open the root of the pile yarn spun from the ultra-fine fiber. Additionally, since a viscous coating agent, i.e., backing agent, (hereinafter referred to as "coating agent") is applied from the back face of the seal member, the applied coating agent infiltrates into pile yarn from a foundation cloth made of ground yarn due to a capillary phenomenon between pieces of fiber and infiltrates into the fiber to a height having an effect on the sealing property. As a result, the solidification of the root of the pile yarn due to the coating agent causes many voids in the root of the pile yarn and deteriorates the sealing property in the root of the pile yarn, resulting in toner leakage from the root of the pile yarn. Therefore, a seal member including crimping fiber in pile yarn has been proposed for taking measures against the toner leakage from the root of the pile yarn (see, e.g., Patent Document 1). However, even in this proposal, the pile yarn including ultra-fine fiber causes higher infiltration of the coating agent into the pile yarn, thereby reducing the expected effect by half.

A proposal has also been made on a seal member that has a certain degree of thickness, that exhibits a proper sealing property, and that can be manufactured without a complicated manufacturing process with reduced manufacturing cost (see, e.g., Patent Document 2). Specifically, the seal member is made of a pile fabric, in which a thickness of a foundation cloth made of ground yarn is 1.0 to 5.0 mm, and the density of pile yarn in the pile fabric is equal to or greater than 60 pieces/mm$^2$. Since the seal member can be manufactured without undergoing a bonding process of a cushion layer on the back side of the seal member as in the conventional case, the seal member eliminates concerns about crushing of the pile yarn occurring due to the bonding. However, more improvements are required in the sealing property and the manufacturability of the seal member for powder using ultra-fine fiber even in this case.

PRIOR ART DOCUMENTS

Patent Documents

Patent Document 1: Japanese Laid-Open Patent Publication No. 2005-201427

Patent Document 2: Japanese Laid-Open Patent Publication No. 2005-300910

SUMMARY OF THE INVENTION

A problem to be solved by the present invention is to provide a seal member for micro-powder that eliminates the conventional problems and that achieves improvement in the property of sealing micro-powder that is toner for a development roller, etc., of an electrophotographic image processing apparatus, copier etc., and the manufacturability.

Means of the present invention for solving the problem will be described with reference to the drawings. The present invention provides a seal member for micro-powder characterized in that a coating process with a coating agent from a back face of a foundation cloth regulates the infiltration of the coating agent into pile yarn to suppress the infiltration of the coating agent into the pile yarn to a height equal to or lower than a thickness of the foundation cloth made of ground yarn supporting the pile yarn. This configuration prevents the coating agent from infiltrating into a portion of the pile yarn equal to or higher than the thickness of the foundation cloth made of the ground yarn and prevents the coating agent from solidifying the root portion of the opened pile yarn. Therefore, for example, operation of an image processing apparatus compresses, and reduces sizes of, voids in the root of the pile yarn, thereby improving the sealing property. Since the infiltration of the coating agent is suppressed to a portion equal to or lower than the thickness of the foundation cloth during the coating with the coating agent, the opening of the pile yarn is facilitated and the sealing property is improved.

Conventionally, if the coating agent infiltrates into a portion equal to or higher than the thickness of the foundation cloth and the coating agent is further infiltrates into the pile yarn at the time of mechanical cutting of knit or fabric that is a seal member, a problem of the fiber-falloff from the knit or the fabric occurs after cleaning, which is a finishing process after the cutting of the knit or the fabric, or during use of the knit or the fabric. However, since the seal member is formed with the infiltration of the coating agent suppressed equal to or lower than the thickness of the foundation cloth of the seal member, the fiber-falloff from the knit or the fabric after the cleaning or during use is reduced to a nonproblematic level.

Discussing the fiber-falloff phenomenon occurring after the cleaning, which is the finishing process after the cutting, if the coating agent infiltrates into an upper portion of pile yarn equal to or higher than the thickness of the ground cloth, phenomena are thought to occur in such a way that the fiber of the infiltration portion is solidified by the coating agent and becomes difficult to cut and that the pile yarn solidified at the time of the cutting is embedded in a crushed state due to a cutting pressure. Therefore, if the infiltration of the coating agent can be suppressed to a range equal to or lower than the thickness of the foundation cloth made of the ground yarn, it is thought that these phenomena are significantly reduced and that the occurrence of the fiber-falloff after the cleaning is significantly improved.

According to a first aspect of the invention, a means of the present invention for solving the problem is a seal member of a rotating body of an apparatus using micro-powder or a rotating body of an image forming apparatus using toner that is micro-powder. Specifically, in the seal member preventing leakage of the micro-powder from the rotating body, the seal member comprises a foundation cloth made of ground yarn of knit or fabric, a looped pile yarn or cut pile yarn formed on a surface of the foundation cloth dependent on entanglement of the ground yarn of the foundation cloth or support by the ground yarn, and a coating layer that infiltrates toward the pile yarn from a back face of the foundation cloth to which a coating agent is applied, and the coating layer infiltrating from the back side of the foundation cloth has an infiltration height equal to or less than a height of the ground yarn of the foundation cloth supporting the pile yarn, i.e., a thickness of the foundation cloth made up of the ground yarn.

According to a second aspect of the invention, the looped pile yarn or cut pile yarn formed on the surface of the foundation cloth is pile yarn formed by spinning or yarn-making from at least two or more pieces of fiber. In the seal member preventing leakage of the micro-powder from the rotating body of the means of the first aspect of the invention, the seal member comprises the pile yarn that at least includes fiber having a thickness from 3 deniers, i.e., 20 μm or less to 0.1 deniers, i.e., 4 μm as fiber used for the pile yarn, and the seal member has the coating layer made of the coating agent infiltrating from the back face of the foundation cloth.

A third aspect of the invention provides the seal member preventing leakage of the micro-powder from the rotating body of the means of the second aspect of the invention, wherein with regard to the coating layer made of the coating agent infiltrating from the back face of the foundation cloth, the seal member has the coating layer with an infiltration height of the coating agent infiltrating from the back face of the foundation cloth toward the pile yarn controlled within the ground yarn of the foundation cloth by adjusting a thickness of the fiber used for the pile yarn, a viscosity of the coating agent, a molecular weight of resin used for the coating agent, a temperature at the time of coating, an additive amount of a leveling agent added to the coating agent, and a time after the coating until dried.

A fourth aspect of the invention provides the seal member preventing leakage of the micro-powder from the rotating body of the means of the third aspect of the invention, wherein the seal member having the coating layer with the infiltration height of the coating agent infiltrating from the back face of the foundation cloth toward the pile yarn controlled within the ground yarn of the foundation cloth has an elastic body made of a sheet layer disposed on a back face of a highly viscous resin layer having a regulated elasticity formed on a backside surface of the foundation cloth made of the ground yarn of knit or fabric.

EFFECTS OF THE INVENTION

According to the first aspect of the invention, since the seal member has the coating layer formed within a range of the foundation cloth by impregnation with the coating agent from the back face of the foundation cloth in a portion where micro-powder leaks from the rotating body of the apparatus using the micro-powder, the use of the seal member prevents the leakage of the micro-powder, i.e., toner of the image forming apparatus. According to the second aspect of the invention, since the thickness of the fiber making up the seal member is from 3 deniers or less to 0.1 deniers, the leakage of the micro-powder, i.e., toner, ranging from 10 μm or less to 0.62 μm can be prevented in addition to the effect of the first aspect of the invention. According to the third aspect of the invention, since the height of the coating agent infiltrating into the seal member is controlled and limited within the ground yarn of the foundation cloth, the effects of the first and second aspects of the invention can more accurately be exerted. According to the fourth aspect of the invention, since the coating agent further regulates the stretch property of the structure of the backside surface of the foundation cloth made of the ground yarn of knit or fabric due to the elastic body made of the sheet layer, variation in the leakage is eliminated and the sealing effect can be maintained for a long time without deterioration.

DETAILED DESCRIPTION

Embodiments of the present invention will be described with reference to the tables and the drawings. In a rotating body that is an apparatus used for executing various processes by using micro-powder 10, a seal member 1 preventing leakage of the micro-powder 10 from the rotating body, for example, the seal member 1 preventing toner, i.e., the micro-powder 10 from the rotating body of an electrophotographic image forming apparatus consists of a foundation cloth 2 made of ground yarn 2a forming knit or fabric; looped pile yarn 3a formed on the surface of the foundation cloth 2 dependent on entanglement of the ground yarn 2a or support by the ground yarn 2a, or cut pile yarn 3b formed by cutting and impregnating the looped pile yarn 3a; and a coating layer 4a formed by applying a coating agent 4 to the back face of the foundation cloth 2. Since the coating agent 4 is applied to the back face of the foundation cloth 2 made of the ground yarn 2a to form the coating layer 4a, the coating layer 4a infiltrates from the back face of the foundation cloth 2 into the surface of yarn 2a supporting the pile yarn 3 and to know a state of the fiber-falloff of the pile yarn 3 due to the solidified coating layer 4a. These items were checked by performing tests.

Figure 5:
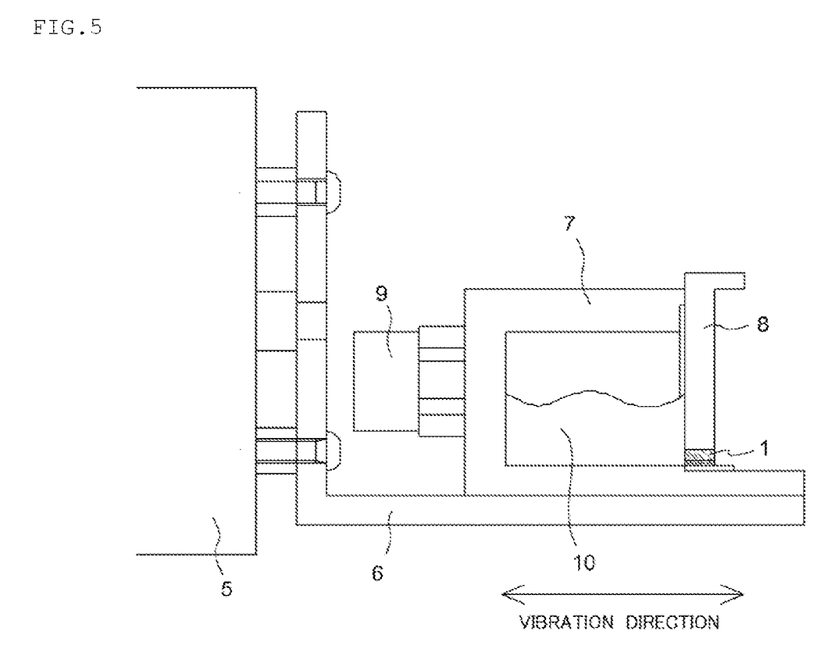
FIG. 5 is a schematic of a vibration test apparatus demonstrating the effects of the seal member.

A test apparatus depicted in FIG. 5 was used; the micro-powder 10 of particles having an average particle diameter of 6 μm was put into a container 7; a side portion of the container 7 was closed with a vertical cover 8; an exit at the lower portion of the cover 8 was disposed with the seal member 1 made of the pile yarn 3 with the coating layer 4a formed from the back face of the foundation cloth 2; and a vibrator 5 vibrated the container 7 placed on an angle 6 at constant acceleration. In this case, the seal member 1 made of the pile yarn 3 with the coating layer 4a formed from the back face of the foundation cloth 2 was disposed in a gap between the bottom wall of the container 7 and the cover 8 with a constant mounting load of the seal member 1 to perform the vibration test. In this test, as described in table 1, a viscosity of the coating agent 4, a material of the coating agent 4, and a fineness (denier) of fabric making up the pile yarn 3 were employed and varied as variable factors with a constant thickness of the foundation cloth 2 to test eight types having Test Nos. 1 to 8, making evaluations on the thickness of the foundation cloth 2, an infiltration height of the coating layer 4a, a difference between the infiltration height and the thickness of the foundation cloth, a fiber-falloff level indicative of a fiber-falloff state of the pile yarn 3, and a level of the sealing property acquired from the vibration test. These evaluations are listed in Table 1. In the test, two types of materials A and B having viscosities of 4500 cp and 9000 cp were used as the coating agent 4, and the materials A and B of the coating agent 4 were an acrylic material and an acrylic hard-type material, respectively. The thickness of the foundation cloth 2 is 0.85 mm in every case.

TABLE 1

Figure 1:
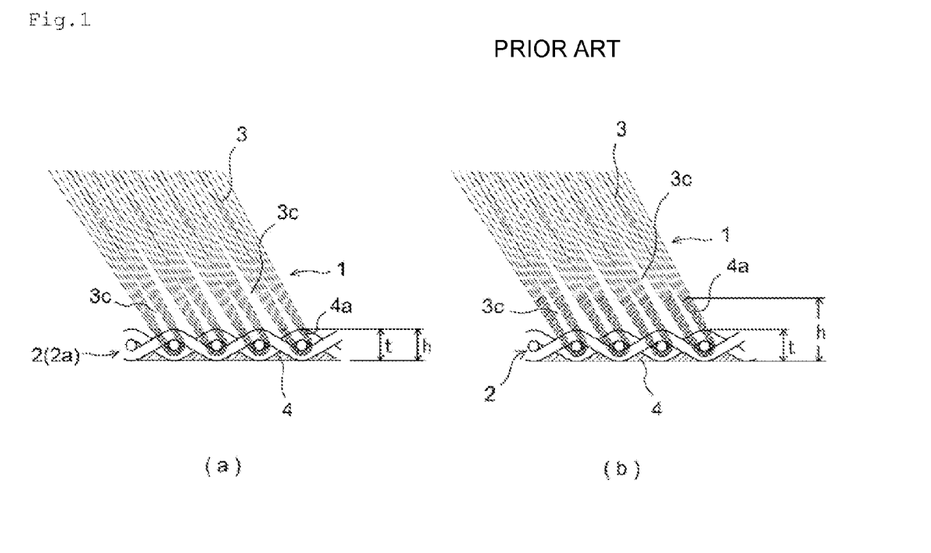
FIG. 1 is a schematic of a foundation cloth and pile yarn after coating from a lateral view; (a) is a diagram of an example of the present invention when infiltration of a coating agent stops within the foundation cloth; and (b) is a diagram of an example when the infiltration of the coating agent reaches the pile yarn above the foundation cloth.

| | test No. | | | | | | | |
|---|---|---|---|---|---|---|---|---|
| | 1 | 2 | 3 | 4 | 5 | 6 | 7 | 8 |
| viscosity of coating agent | 4500 cp | 4500 cp | 4500 cp | 4500 cp | 9000 cp | 9000 cp | 9000 cp | 9000 cp |
| material of coating agent | A | A | B | B | A | A | B | B |
| thickness of fiber (denier) | 0.5 | 3.0 | 0.5 | 3.0 | 0.5 | 3.0 | 0.5 | 3.0 |
| thickness of foundation cloth (mm) | 0.85 | 0.85 | 0.85 | 0.85 | 0.85 | 0.85 | 0.85 | 0.85 |
| infiltration height (mm) | 1.27 | 1.15 | 1.25 | 0.65 | 0.95 | 0.61 | 0.56 | 0.46 |
| infiltration height − foundation cloth thickness (mm) | +0.42 | +0.3 | +0.4 | −0.2 | +0.1 | −0.24 | −0.29 | −0.39 |
| fiber-falloff level | x | x | x | ○ | x | ○ | ○ | ○ |
| sealing property (vibration test) | Δ | Δ | Δ | ○ | Δ | ○ | ○ | ○ |
| Δ: 20 or more and less than 50 | | | | | | | | |
| ○: 50 or more (m/sec$^2$) | | | | | | | | | the ground yarn 2a and solidifies the foundation cloth 2 made of the ground yarn 2a that supports the pile yarn 3. In this case, as depicted in FIG. 1, if the coating layer 4a infiltrating into the surface of the ground yarn 2a infiltrates into the root of the pile yarn 3 before solidification, the root portion of the pile yarn 3 is solidified by the coating layer 4a and many voids 3c are generated in the root portion of the pile yarn 3, deteriorating the sealing property of the root portion of the pile yarn 3. Therefore, it is important for using the optimum seal member 1 to know relationships of material and property of the coating layer 4a to the foundation cloth 2 made of the ground As depicted in Table 1, in Test No. 4, the viscosity of the coating agent 4 is 4500 cp; the material of the coating agent 4 is the material B; the thickness of fiber is 3.0 deniers; the thickness of the foundation cloth 2 is 0.85 mm; and the infiltration height of the coating agent 4 is 0.65 mm. Therefore, since the infiltration height into the pile yarn 3 is −0.2 mm, which is acquired by subtracting the thickness of the foundation cloth 2 from the infiltration height, as indicated by infiltration height−foundation cloth thickness, the infiltration of the coating agent is only within the foundation cloth 2, meaning that the coating agent did not infiltrate equal to or greater than the thickness of the foundation cloth. The fiber-falloff level is indicated by a circle mark, meaning that the fiber-falloff was not found. Since the vibration acceleration is 50 m/sec$^2$ or more, the sealing property is indicated by a circle mark, meaning that the leakage of the micro-powder 10 was not found and that the sealing property was favorable.

In Test No. 6, the viscosity of the coating agent 4 is 9000 cp; the material of the coating agent 4 is the material A; the thickness of fiber is 3.0 deniers; the thickness of the foundation cloth 2 is 0.85 mm; and the infiltration height of the coating agent 4 is 0.61 mm. Therefore, since the infiltration height into the pile yarn 3 is −0.24 mm, which is acquired by subtracting the thickness of the foundation cloth 2 from the infiltration height, as indicated by infiltration height−foundation cloth thickness, the infiltration of the coating agent is only within the foundation cloth 2, meaning that the coating agent did not infiltrate equal to or greater than the thickness of the foundation cloth. The fiber-falloff level is indicated by a circle mark, meaning that the fiber-falloff was not found. Since the vibration acceleration is 50 m/sec$^2$ or more, the sealing property is indicated by a circle mark, meaning that the leakage of the micro-powder 10 was not found and that the sealing property was favorable.

In Test No. 7, the viscosity of the coating agent 4 is 9000 cp; the material of the coating agent 4 is the material B; the thickness of fiber is 0.5 deniers; the thickness of the foundation cloth 2 is 0.85 mm; and the infiltration height of the coating agent 4 is 0.56 mm. Therefore, since the infiltration height into the pile yarn 3 is −0.29 mm, which is acquired by subtracting the thickness of the foundation cloth 2 from the infiltration height, as indicated by infiltration height−foundation cloth thickness, the infiltration of the coating agent is only within the foundation cloth 2, meaning that the coating agent did not infiltrate equal to or greater than the thickness of the foundation cloth. The fiber-falloff level is indicated by a circle mark, meaning that the fiber-falloff was not found. Since the vibration acceleration is 50 m/sec$^2$ or more, the sealing property is indicated by a circle mark, meaning that the leakage of the micro-powder 10 was not found and that the sealing property was favorable.

In Test No. 8, the viscosity of the coating agent 4 is 9000 cp; the material of the coating agent 4 is the material B; the thickness of fiber is 3.0 deniers; the thickness of the foundation cloth 2 is 0.85 mm; and the infiltration height of the coating agent 4 is 0.46 mm. Therefore, since the infiltration height into the pile yarn 3 is −0.39 mm, which is acquired by subtracting the thickness of the foundation cloth 2 from the infiltration height, as indicated by infiltration height−foundation cloth thickness, the infiltration of the coating agent is only within the foundation cloth 2, meaning that the coating agent did not infiltrate equal to or greater than the thickness of the foundation cloth. The fiber-falloff level is indicated by a circle mark, meaning that the fiber-falloff was not found. Since the vibration acceleration is 50 m/sec$^2$ or more, the sealing property is indicated by a circle mark, meaning that the leakage of the micro-powder 10 was not found and that the sealing property was favorable.

In other Test Nos. 1, 2, 3, and 5, the filtration height of the coating agent 4 is greater than the thickness of the foundation cloth 2; therefore, the infiltration heights into the pile yarn 3 are +0.42 mm, +0.3 mm, +0.4 mm, and +0.1 mm, which are respectively acquired by subtracting the thickness of the foundation cloth 2 from the infiltration heights, as indicated by infiltration height−foundation cloth thickness; and all these values are positive, meaning that the coating agent infiltrated into the pile yarn 3. The fiber-falloff level is indicated by a cross mark in each case, meaning that the fiber-falloff was found. The sealing property is indicated by a triangle mark in each case, and the acceleration is 20 m/sec$^2$ or more and less than 50 m/sec$^2$.

Figure 2:
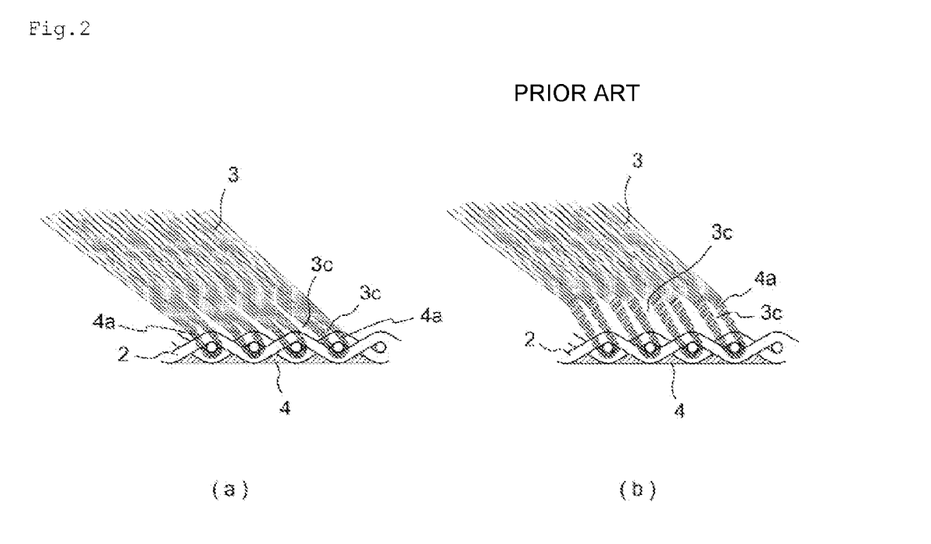
FIG. 2 is a schematic of a compressed state of a seal member consisting of the foundation cloth and the pile yarn after the coating from a lateral view; (a) is a diagram of an example of the present invention when the infiltration of the coating agent stops within the foundation cloth; and (b) is a diagram of an example when the infiltration of the coating agent reaches the pile yarn above the foundation cloth.

Since the infiltration of the coating agent 4 is suppressed equal to or less than a thickness t of the foundation cloth 2 made of the ground yarn 2a in the seal member 1 of the present invention, an infiltration height h of the coating agent 4 is at most the same height as the thickness t of the foundation cloth 2 as depicted in (a) of FIG. 1. Therefore, the fiber of the pile yarn 3 is not solidified in a portion higher than the thickness t of the foundation cloth 2 by the coating layer 4a made of the coating agent 4. Therefore, for example, even when a container wall on the side of a rotation shaft of a container containing the micro-powder 10 is compressed toward the rotation shaft to compress the pile yarn 3 of the seal member 1 attached between the container wall and the rotation shaft, the pile yarn 3 can be folded down at the root of the pile yarn 3 on the upper surface of the foundation cloth 2 as depicted in (a) of FIG. 2. As a result, a gap 3c near the root of the pile yarn 3 is reduced in size and causes the improvement in the leakage level of the micro-powder 10 from the gap 3c near the root, leading to the favorable sealing property for the micro-powder 10.

On the other hand, as depicted in (b) of FIG. 1, the conventional seal member 1 has the infiltration height h of the coating agent 4 greater than the thickness t of the foundation cloth 2 that is the ground yarn 2a, and the coating agent 4 infiltrates into a position of the pile yarn 3 above the foundation cloth 2 and forms the coating layer 4a to solidify the fiber of the pile yarn 3. Therefore, for example, when the container wall on the side of the rotation shaft of the container containing the micro-powder 10 is compressed toward the rotation shaft to compress the pile yarn 3 of the seal member 1 attached between the container wall and the rotation shaft, the solidified portion cannot sufficiently be folded down since the pile yarn 3 is solidified by the coating layer 4a as depicted in (b) of FIG. 2. As a result, the gap 3c in the root of the pile yarn 3 is increased in size and causes the leakage of the micro-powder 10, leading to the deteriorated sealing property.

Although it is conventionally known to apply the coating agent 4 to the back face of the foundation cloth 2, the infiltration property of the coating agent 4 is not considered in the seal member 1 using spun yarn or pile yarn formed by yarn-making. In contrast, in the present invention, it is found that suppressing the infiltration property of the coating agent 4 equal to or lower than the thickness t of the foundation cloth 2 made of the ground yarn 2a can improve the function of the seal member 1 and achieve improvement in workability when the seal member 1 is manufactured.

In the present invention, the pile yarn 3 manufactured by spinning or yarn-making from fiber is used for applying the pile yarn 3 to the seal member 1 consisting of the foundation cloth 2 made of knit or fabric and the looped pile 3a formed on the foundation cloth 2 or the cut pile 3b formed by cutting the loop. In this case, the seal member 1 of the present invention is applicable as a seal member that prevents leakage of the micro-powder 10 regardless of whether a shape of the seal member 1 is a sheet shape or a circular shape. Recently, an average particle diameter of the toner 10, i.e. the micro-powder 10 becomes equal to or lower than 10 μm in developer used for electrophotography, and a diameter of fiber applied to the seal member 1 accordingly becomes smaller. However, it is theoretically ascertained that ultra-fine fiber cannot sufficiently be utilized under the conventional concept giving no consideration to the infiltration of the coating layer 4a made of the coating agent 4 into the pile yarn 3. In view of these points, the present invention is extremely excellent partly because the ultra-fine fiber can be fully utilized.

Figure 3:
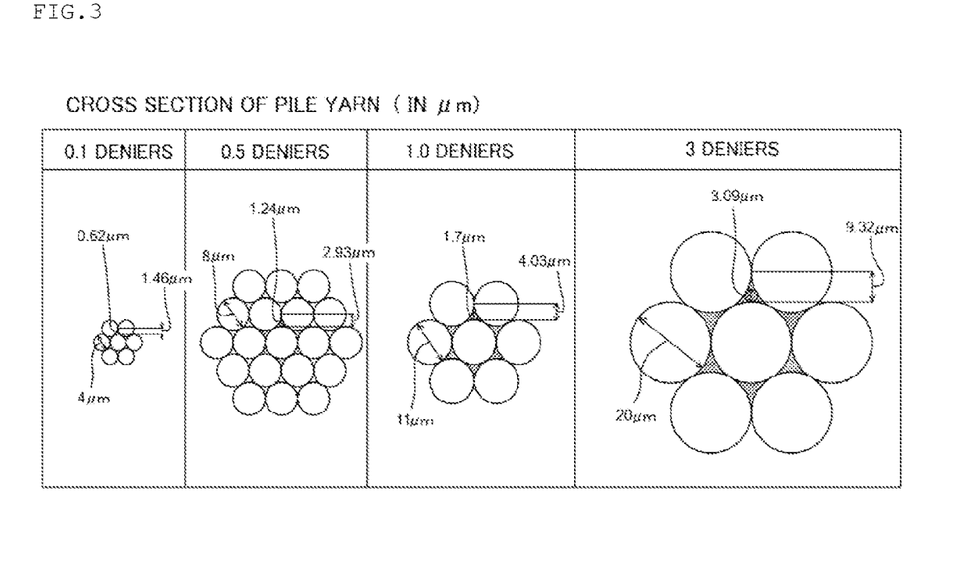
FIG. 3 is a schematic representative of cross sections of pile yarn made of fiber when a thickness of the fiber is 0.1 deniers, 0.5 deniers, 1.0 denier, and 3 deniers, depicting a thickness of each piece of the fiber, a height of a gap among pieces of the fiber, and a size of a circle fit to the gap.

FIG. 3 schematically depicts relationships of a diameter of fiber making up the pile yarn 3 to a size of the gap 3c among pieces of the fiber and to a size of a particle diameter that may be received in the gap 3c. The size of the gap 3c of the pile yarn 3 made of fiber having a thickness of 3 deniers, i.e., 20 μm corresponds to the height of 9.32 μm from the top of the lower pile yarn 3 to the contact surface between the upper left and right pile yarns 3, 3, and the particle diameter capable of entering into the gap 3c is 3.09 μm. The size of the gap 3c of the pile yarn 3 made of fiber having a thickness of 1.0 denier, i.e., 11 μm corresponds to the height of 4.03 μm from the top of the lower pile yarn 3 to the contact surface between the upper left and right pile yarns 3, 3, and the particle diameter capable of entering into the gap 3c is 1.7 μm. The size of the gap 3c of the pile yarn 3 made of fiber having a thickness of 0.5 deniers, i.e., 8 μm corresponds to the height of 2.93 μm from the top of the lower pile yarn 3 to the contact surface between the upper left and right pile yarns 3, 3, and the particle diameter capable of entering into the gap 3c is 1.24 μm. The size of the gap 3c of the pile yarn 3 made of fiber having a thickness of 0.1 deniers, i.e., 4 μm corresponds to the height of 1.46 μm from the top of the lower pile yarn 3 to the contact surface between the upper left and right pile yarns 3, 3, and the particle diameter capable of entering into the gap 3c is 0.62 μm. Therefore, since even the currently used ultra-fine toner having a diameter equal to or lower than 10 μm has a diameter larger than 3.09 μm, the toner is unable to pass through the diameter of 3.09 μm of the gap 3c of the pile yarn 3 made of fiber having a thickness of 3 deniers, i.e., 20 μm. From this perspective, it is known that the fiber of the pile 3 making up the seal member 1 must be fiber having a diameter ranging from 3 deniers, i.e., 20 μm or less to 0.1 deniers, i.e., 4 μm in the present invention.

Figure 4:
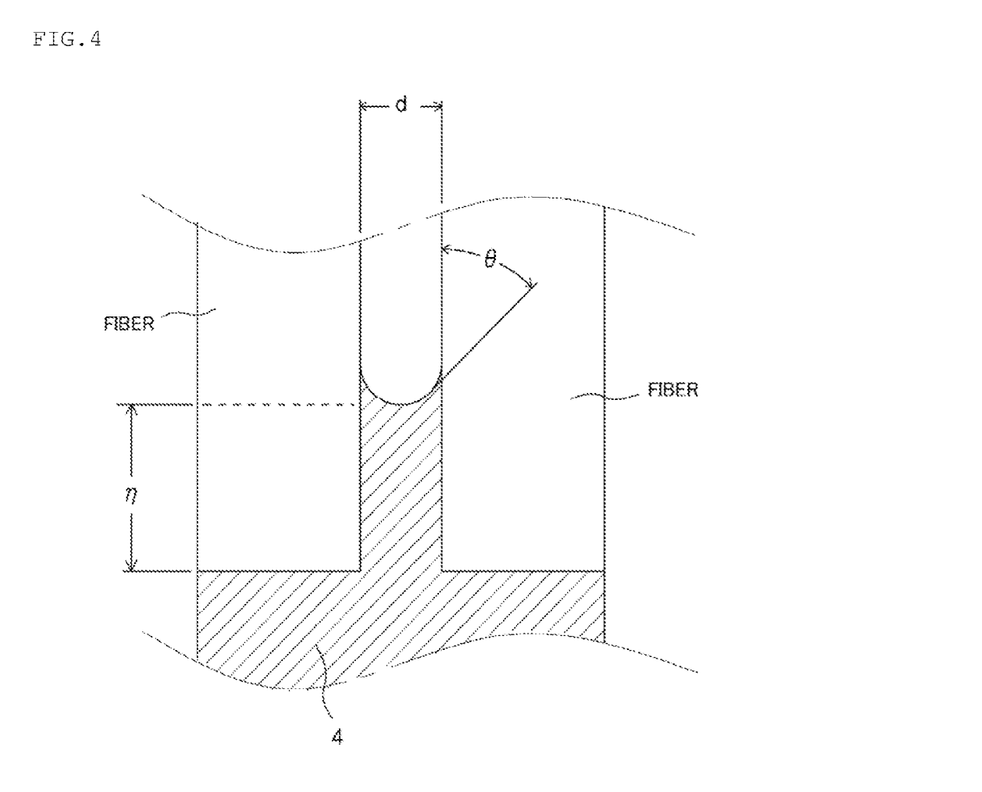
FIG. 4 is a schematic of a capillary phenomenon between pieces of the fiber.

FIG. 4 depicts a capillary phenomenon for explaining a phenomenon of the coating agent 4 infiltrating from the back face of the foundation cloth 2 toward the pile yarn 3. Specifically, a relationship between the capillary phenomenon and a height from a liquid level is depicted in FIG. 4 and expressed as an equation Eq. 1, which is a calculation formula as described below. Since the fiber of the pile 3 is fiber having a diameter ranging from 3 deniers, i.e., 20 μm or less to 0.1 deniers, i.e., 4 μm as described above, when a distance d between pieces of the fiber surrounded by three pieces of the pile yarn 3c is a diameter of a circular portion formed within the gap as depicted in FIG. 3, d=3.09 μm is formed by the diameter of the circular portion in the case of the pile yarn 3 having the thickness of 3 deniers, i.e., 20 μm; d=1.7 μm is formed by the diameter of the circular portion in the case of the pile yarn 3 having the thickness of 1.0 denier, i.e., 11 μm; and d=1.24 μm is formed by the diameter of the circular portion in the case of the pile yarn 3 having the thickness of 0.5 deniers, i.e., 8 μm. Therefore, if the coating agent 4 infiltrates from the back face of the foundation cloth 2 toward the pile yarn 3, the infiltration is facilitated by a narrower fiber distance based on the capillary phenomenon expressed by Eq. 1. Therefore, as depicted in Table 1, the seal member 1 using a member with a thinner fiber thickness forming a narrower fiber distance results in more facilitated infiltration from the back face of the foundation cloth 2 toward the pile yarn 3.

$$h = 4\eta \cos \theta / [g(\rho 1 - \rho 2)d] \quad \text{(Eq. 1)}$$

where h is infiltration height, η is surface tension, θ is contact angle, g is acceleration of gravity, ρ1 is density of coating agent, ρ2 is density of atmosphere, and d is fiber distance.

The infiltration of the coating agent 4 of the present invention from the back face of the foundation cloth 2 toward the pile yarn 3 proceeds based on this equation. On the other hand, for the coating agent 4, based on Table 1 described above, a coating agent is selected and used that has the surface tension and the density causing impregnation into the foundation cloth 2 made of the ground yarn 2a without impregnation into the pile yarn 3 when using the viscosity of 4500 cp or 9000 cp and the materials A and B of the coating agent 4, which are an acrylic material and an acrylic hard-type material, respectively. Addition of a leveling agent, i.e., a surface conditioner, to the coating agent 4 for controlling the surface tension has an effect of reducing the surface tension. Even an additive amount equal to or less than 1% generally has an effect of reducing the surface tension.

Types of the leveling agent include acrylic, vinyl, silicone, and fluorine types. For the acrylic coating agent 4 of the present invention, an acrylic leveling agent is used that has favorable affinity therewith. In the capillary phenomenon described above, when no leveling agent is added to a solution, the contact angle θ depicted in FIG. 4 is 6.6 degrees. On the other hand, when an acrylic leveling agent (Item No. L-1984-50, Kusumoto Chemicals, Ltd) is added by 0.4%, the contact angle θ is 4.6 degrees, and when an acrylic leveling agent (Item No. LHP-91, Kusumoto Chemicals, Ltd) is added by 0.2%, the contact angle θ is 2.8 degrees. As described above, the addition of the leveling agent, i.e., a surface conditioner, to the coating agent 4 has an effect of reducing the contact angle θ relative to the fiber impregnated with the coating agent 4, resulting in reduction of the impregnation height. In the aspect of the invention according to claim 3 of this application, the leveling agent is added in an additive amount adjusted as needed in this sense.

Figure 6:
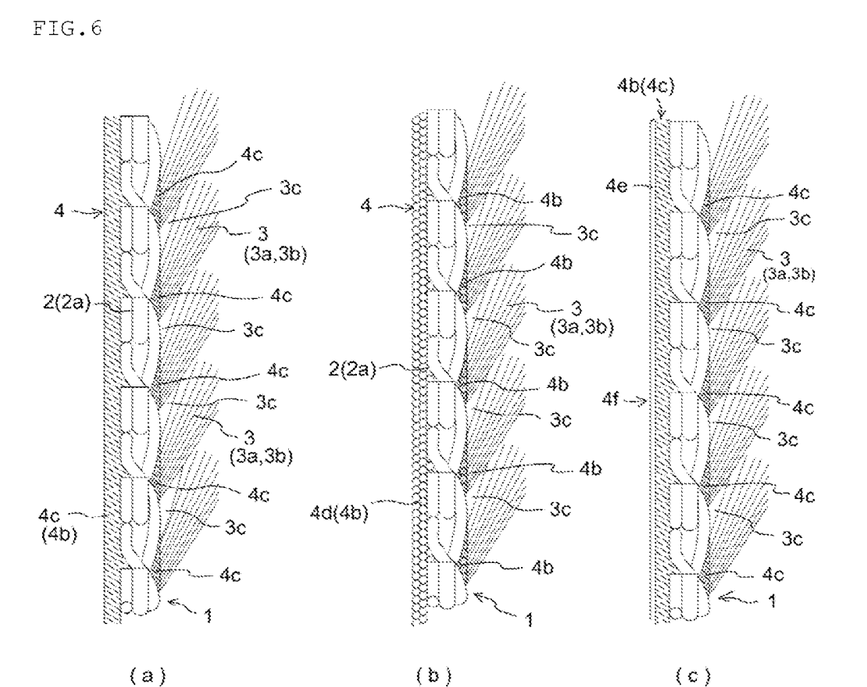
FIGS. 6(a) to 6(c) are a schematic of an enlarged side view of the seal member made of a weft-knitted foundation cloth having a resin layer on the back face and pile yarn on the front surface.

To achieve a structure having a regulated stretch property of the knitted seal member 1, in a first example, on the surface on the back side of the knit, as depicted in (a) of FIG. 6, a resin coating layer 4c formed by application is applied from the back face of the foundation cloth 2 made of the ground yarn 2a and is formed as the seal member 1 by impregnation into the surface portion of the foundation cloth 2 made of the ground yarn 2a in the root of the pile yarn 3. In a second example, on the surface on the back side of the knit, as depicted in (b) of FIG. 6, a resin spray coat layer 4d formed by spraying is disposed on the back face of the foundation cloth 2 made of the ground yarn 2a and is formed as the seal member 1 by impregnation into the surface portion of the foundation cloth 2 made of the ground yarn 2a in the root of the pile yarn 3. In a third example, as depicted in (c) of FIG. 6, the seal member 1 is formed with a resin sheet 4e having a foam resin elastic body 4f therein attached to the back face of the seal member 1 impregnated with the resin coating layer in the surface portion of the ground cloth 2 of (a) of FIG. 6 and, when used, release paper on the backside surface is peeled off and the seal member 1 is bonded to a place of prevention of leakage of the micro-powder, for example, the toner, with an adhesive consisting of a highly viscous resin layer 4b included on the resin seal 4e of the foam resin elastic body 4f. These seal members 1 are formed such that the seal members are stretched 5% or less even under the effect of a predetermined tension load or contact friction. A resin coating agent used for the resin coating layer 4c of (a) of FIG. 6 or the resin spray coat layer of (b) of FIG. 6 is an acrylic resin, a urethane resin, an olefin resin, etc., particularly, an acrylic or olefin resin having a smaller stretch property. In this case, the seal member 1 with unconventionally low contact load preventing the leakage of the micro-powder 10 is acquired by peeling off the release paper of the resin sheet 4e having the elastic body therein, attaching the elastic body of the resin sheet 4e with the release paper peeled off to the back face consisting of the highly viscous resin layer 4b regulating the stretch property of knit, and bonding the seal member 1 to the place of prevention of the leakage of the micro-powder 10.

Figure 7:
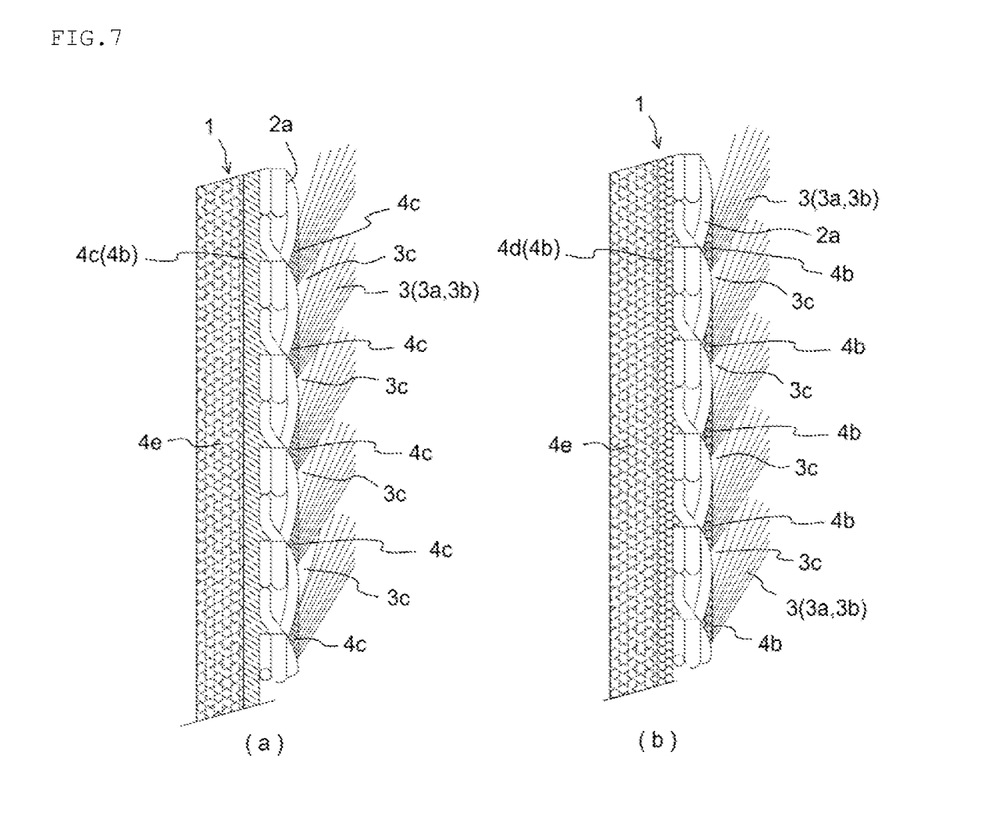
FIGS. 7(a) to 7(b) are a schematic of an enlarged side view of a weft-knitted product having cut pile yarn with an elastic body formed on the back face of the resin layer.

Specifically, as depicted in (a) of FIG. 7, for example, the release paper of the resin sheet 4e having the elastic body therein is peeled off, and the elastic body of the resin sheet 4e with the release paper peeled off is attached to the back face of the resin coating layer 4c that is the highly viscous resin layer 4b regulating the stretch property of knit depicted in (a) of FIG. 6, or as depicted in (b) of FIG. 7, for example, the release paper of the resin sheet 4e having the elastic body therein is peeled off, and the elastic body of the resin sheet 4e with the release paper peeled off is attached to the back face of the resin spray coat layer 4d that is the highly viscous resin layer 4b regulating the stretch property of knit depicted in (b) of FIG. 6. The seal member 1 having the elastic body is applied to a place necessary to be sealed. In this way, the prevention of leakage of powder is improved with a contact load lower than a conventional seal member that regulates the leakage of powder.

Figure 8:
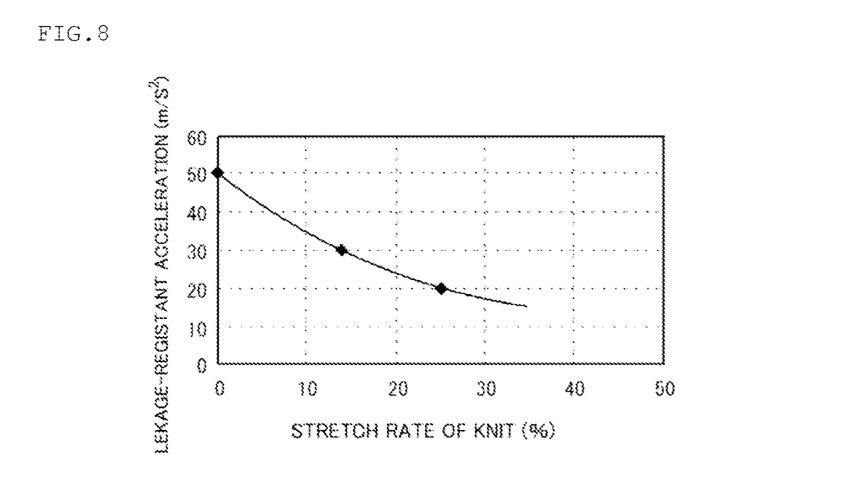
FIG. 8 is a graph of relationship between a stretch rate (%) of knit and a leakage-resistant acceleration from a vibration test of a plating pile knit seal member.

The foundation cloth 2 having weft-knitted pile was formed as knit having 28 gauges and 50 stitches per inch from microfiber of a material made of acrylic and cotton. A vibration test of the knit is performed with a frequency of 50 Hz and a seal load of 15 g/cm$^2$ by vibrating the test material depicted in FIG. 5 with the vibrator 5 to conduct an experiment of the stretch property and leakage of the seal member 1. The experimental result is described in Table 2 by comparing a stretch rate (%) with a leakage-resistant acceleration (m/s$^2$). The experimental result is also represented as a pile stitch vibration test by a graph of FIG. 8 using the stretch rate (%) of knit as a horizontal axis and the leakage-resistant acceleration (m/s$^2$) as a vertical axis.

TABLE 2

| stretch rate | leakage-resistant acceleration (m/s$^2$) |
| --- | --- |
| 0 | 50 |
| 14 | 30 |
| 25 | 20 |

Figure 9:
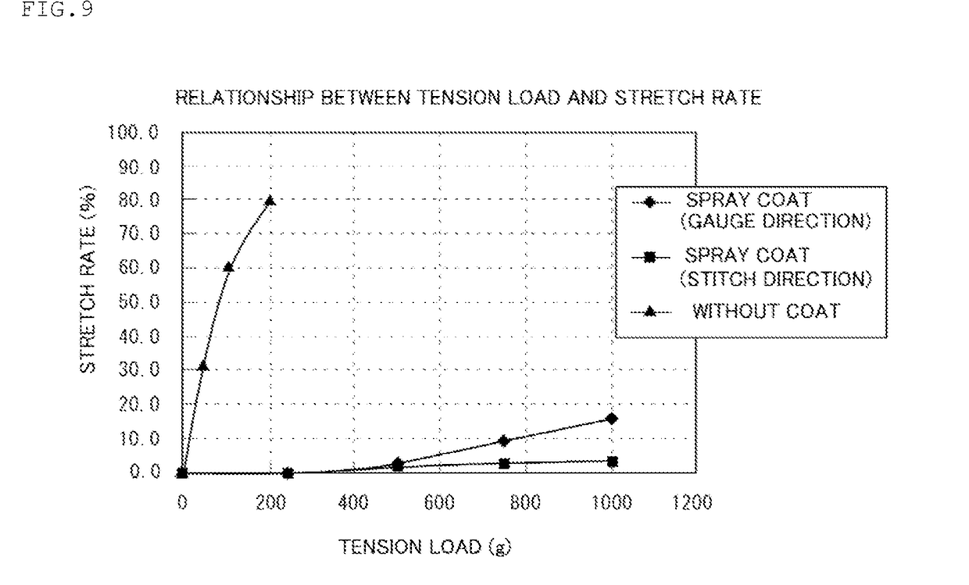
FIG. 9 is a graph of relationship between tension loads (g) and stretch rates (%) in the gauge and stitch directions when a resin spray coat layer is formed and in the absence of the resin spray coat layer.

In Table 3, (a) and (b) describe relationships between tension loads (g) and stretch rates (%) in the gauge and stitch directions of the resin spray coat layer 4d when the resin spray coat layer 4d is formed by spraying as depicted in (b) of FIG. 6 on the back face of knit, and in the gauge and stitch directions in the absence of the resin spray coat layer 4d for reference. The relationships between the tension loads (g) and the stretch rates (%) are depicted in FIG. 9. As can be seen in Table 3 and FIG. 9, as a result of evaluation of the stretch of the knit, if the resin spray coat process is not executed, the knit is significantly stretched with a small tension. On the other hand, the significant stretch can be regulated by applying the resin spray coat layer 4d by spraying.

TABLE 3

| | (a) | |
| --- | --- | --- |
| | stretch rate (%) | |
| tension load (g) | with spray coat (gauge direction) | with spray coat (stitch direction) |
| 0 | 0.0 | 0.0 |
| 250 | 0.0 | 0.0 |
| 500 | 2.3 | 1.6 |
| 750 | 8.9 | 2.6 |
| 1000 | 15.5 | 3.3 |

| (b) | |
| --- | --- |
| tension load (g) | stretch rate (%) without resin coat |
| 0 | 0.0 |
| 50 | 31.7 |
| 100 | 60.0 |
| 200 | 80.0 |

Figure 10:
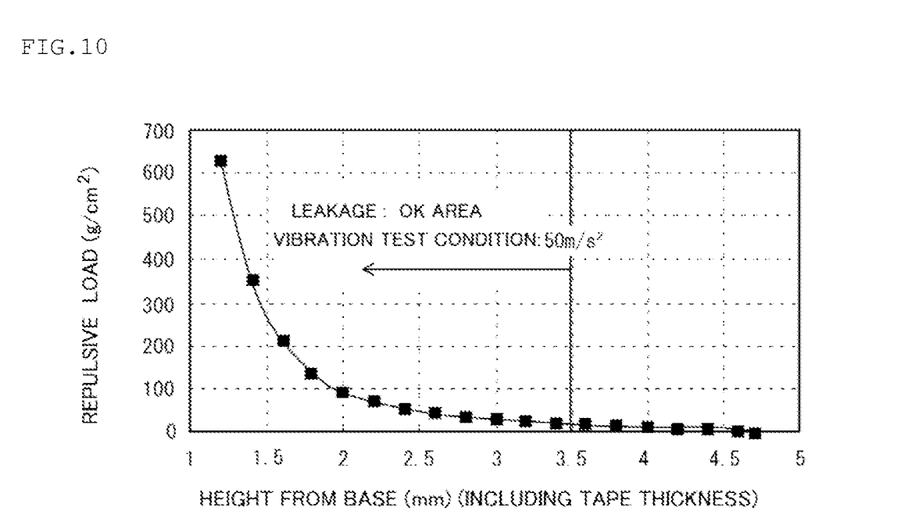
FIG. 10 is a graph of sealing property represented by a relationship between a repulsive load and a height from a base when the elastic body is bonded to the seal member of the present invention.

A relationship between a repulsive load and a sealing property acquired by bonding the resin seat 4e having the elastic body to the seal member 1 made of the cut pile yarn 3b of the present invention is represented by a graph of a relationship between a repulsive load (g/cm$^2$) and a height (mm) from the base of the seal member 1 including a tape of the elastic body in FIG. 10. In this case, the vibration test condition is an acceleration of 50 m/s$^2$. In FIG. 10, an area of LEAKAGE: OK indicates that the toner 7 does not leak out at the vibration acceleration of 50 m/s$^2$. Therefore, as can be seen in FIG. 10, it is found out that, when using the knit of the present invention, i.e., the seal member 1 made of the weft-knitted cut pile yarn 3b, a range of use conditional on the absence of leakage is extended to the height of 3.5 mm from the base of the seal member 1 including the tape of the elastic body.

Figure 11:
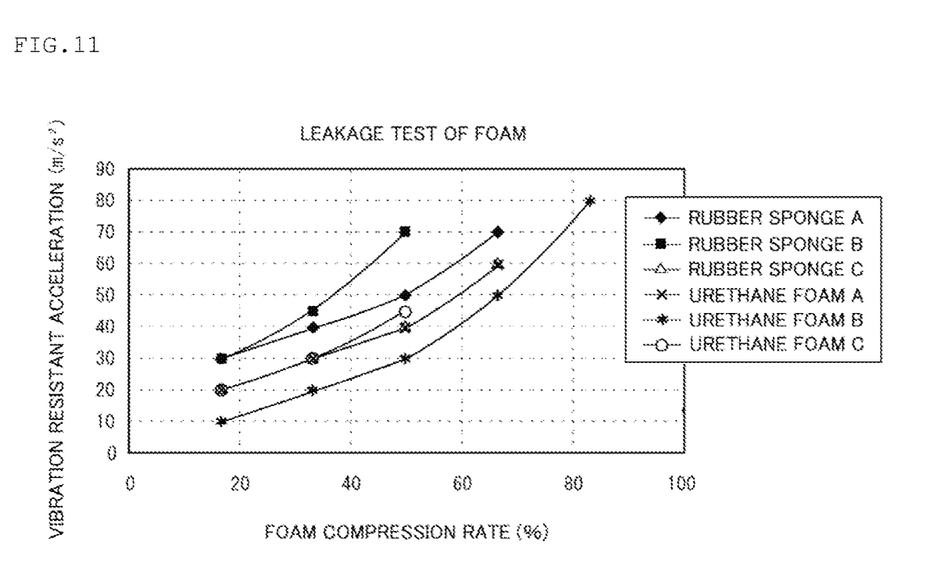
FIG. 11 is a graph of a relationship between a foam compression rate and vibration resistance in a leakage test of various foams.

When the resin seat 4e having the elastic body regulating the leakage of powder is disposed on the lower surface of the highly viscous resin layer 4b regulating the stretch property formed on the back face of the knit, the blockage force for preventing the leakage of powder can be maximized by using a closed-cell foam as the elastic body. As depicted in FIG. 11, even if the foam of the elastic body has open cells, the elastic body can endure the acceleration of 30 m/s$^2$ at a contact load corresponding to the compression rate of 50%. Therefore, at a contact load corresponding to the compression load of 50% or more or a range of the compression load from 10 g/cm$^2$ to 500 g/cm$^2$, the leakage of the micro-powder 10 can be prevented under the vibration with the acceleration of 30 m/s$^2$. In FIG. 11, the elastic body is made of rubber sponge A with a density of 100 kg/m$^3$, rubber sponge B with a density of 140 kg/m$^3$, rubber sponge C with 100 kg/m$^3$, urethane foam A with 28 kg/m$^3$, urethane foam B with 32 kg/m$^3$, or a urethane foam C with 57 kg/m$^3$.

The invention claimed is:

1. A seal member of a rotating body of an apparatus using micro-powder or a rotating body of an image forming apparatus using toner that is micro-powder, said seal member comprising:
    a foundation cloth made of ground yarn of knit or fabric;
    a looped pile yarn or cut pile yarn formed on a surface of the foundation cloth, the looped pile yarn or cut pile yarn being dependent on entanglement of the ground yarn of the foundation cloth or support by the ground yarn; and
    a coating layer configured to infiltrate toward the pile yarn from a back side of the foundation cloth to which a coating agent is applied, wherein
    the coating agent infiltrating from the back side of the foundation cloth has an infiltration height equal to or less than a height of the ground yarn supporting the pile yarn, and
    said seal member is configured to prevent leakage of said micro-powder from said rotating body.

2. The seal member of claim 1, wherein
the looped pile yarn or cut pile yarn formed on the surface of the foundation cloth is pile yarn formed by spinning or yarn-making from at least two or more pieces of fiber,
said seal member comprises the pile yarn that at least includes fiber having a thickness from 0.1 deniers to 3 deniers, and
said seal member has the coating layer made of the coating agent infiltrating from the back face of the foundation cloth.

3. The seal member of claim 2, wherein with regard to the coating layer made of the coating agent infiltrating from the back face of the foundation cloth and a height of the coating agent infiltrating in to the seal member, the seal member has the coating layer with an infiltration height of the coating agent infiltrating from the back face of the foundation cloth toward the pile yarn controlled within the ground yarn of the foundation cloth by adjusting a thickness of the fiber used for the pile yarn, a viscosity of the coating agent, a molecular weight of resin used for the coating agent, a temperature at the time of coating, an additive amount of a leveling agent added to the coating agent, and a time after the coating until dried.

4. The seal member of claim 3, wherein the seal member having the coating layer with the infiltration height of the coating agent infiltrating from the back face of the foundation cloth toward the pile yarn controlled within the ground yarn of the foundation cloth has an elastic body made of a sheet layer disposed on a back face of a highly viscous resin layer having a regulated elasticity formed on a backside surface of the foundation cloth made of the ground yarn of knit or fabric.

* * * * *

UNITED STATES PATENT AND TRADEMARK OFFICE
CERTIFICATE OF CORRECTION

PATENT NO.       : 8,699,910 B2                                        Page 1 of 1
APPLICATION NO.  : 13/389727
DATED            : April 15, 2014
INVENTOR(S)      : Shoji et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 134 days.

Signed and Sealed this
Twenty-ninth Day of September, 2015

Michelle K. Lee
*Director of the United States Patent and Trademark Office*